United States Patent Office 3,661,883
Patented May 9, 1972

3,661,883
PROCESS FOR THE MANUFACTURE OF POLYISOPRENE
Takashi Nishida and Kazuo Itoi, Kurashiki, Japan, assignors to Kurashiki Rayon Co., Ltd., Kurashiki, Okayama Prefecture, Japan
No Drawing. Filed Feb. 24, 1970, Ser. No. 13,748
Claims priority, application Japan, Mar. 1, 1969, 44/15,653; Aug. 13, 1969, 44/64,358
Int. Cl. C08d 3/10, 3/12
U.S. Cl. 260—94.3                    4 Claims

ABSTRACT OF THE DISCLOSURE

A process for the preparation of polyisoprene containing at least 90% of cis-1,4-configuration comprising contacting isoprene in an inert solvent with a catalyst, characterized in that the said catalyst is prepared by mixing in an inert solvent (a) titanium tetrachloride, (b) an organotin hydride of the general formula, $R_mSnH_{4-m}$, in which R is a hydrocarbyl group and m is an integer of 2 or 3, and (c) an aluminium halide selected from the group consisting of aluminium bromide and aluminium iodide.

This invention relates to a process for the manufacture of polyisoprene. More particularly, the invention relates to a process for polymerizing isoprene using a combination catalyst composed of (a) titanium tetrachloride, (b) aluminium bromide or iodide, and (c) an organotin hydride, whereby advancing the polymerization at substantially high rate and obtaining isoprene polymer consisting mainly of cis-1,4-polyisoprene.

One of us previously discovered that polyisoprene of substantially cis-1,4-configuration can be obtained by polymerizing isoprene using a combined catalyst system of an organotin hydride and titanium tetrachloride. However, polymerization rate of the system using said two-component catalyst is relatively low, which makes the industrially advantageous manufacture of cis-1,4-polyisoprene difficult. Accordingly, we further pursued our research works to find that the catalyst prepared by reacting an organotin hydride with titanium tetrachloride in an inert hydrocarbon, removing from the reaction mixture a part or whole of the hydrocarbon-soluble products, and thereafter adding to the remaining reaction product an organoaluminium compound, exhibits higher activity than that of the two-component catalyst system. However, the latter catalyst has a drawback that an additional step of removing at least a part of the hydrocarbon-soluble substances as above is required. Besides, the suitable range of molar ratio of Al/Ti in the catalyst is narrow, and allowable variation range in the molar ratio under a polymerization condition applied is only in the order of ±0.05. Such a catalyst in which the molar ratio of components must be strictly regulated gives various inconveniences in its industrial application.

We have engaged in the research works searching for a new catalyst system which is free from the defects of said combination catalyst of an organotin hydride and titanium tetrachloride, and of the catalyst composed of an organotin hydride, titanium tetrachloride, and an organoaluminium compound, and now discovered that a combined catalyst system composed of (a) titanium tetrachloride, (b) aluminium bromide or iodide, and (c) an organotin hydride, is easy of preparation, that the allowable variation range in molar ratios of the components thereof is broad, and that the catalyst yields polyisoprene of high cis-1,4-configuration content with high efficiency.

Thus, the present invention provides a process for the manufacture of polyisoprene containing at least 90% of cis-1,4-configuration, comprising contacting isoprene in an inert solvent with a catalyst, characterized in that the said catalyst is prepared by mixing in an inert solvent (a) titanium tetrachloride, (b) an organotin hydride of the general formula $R_mSnH_{4-m}$, wherein R is a hydrocarbyl group and m is an integer of 2 or 3, and (c) an aluminium halide selected from the group consisting of aluminium bromide and aluminium iodide.

According to the subject process, not only the isoprene polymerization can be performed at remarkably higher rate than that obtainable with the catalyst formed of titanium tetrachloride and an organotin hydride, but also the activity of the novel catalyst system is higher than that of conventional Ziegler catalyst, and content of cis-1,4-configuration in the product polyisoprene is higher than that in the polyisoprene obtained with the use of titanium tetrachloride-organotin hydride catalyst.

It is important that the aluminium halide component of the novel catalyst is either aluminium bromide or iodide. It should never be aluminium chloride, which is frequently employed for improving conventional Ziegler catalyst. As demonstrated in the later appearing Control, addition of aluminium chloride extremely reduces the polymerization activity of the catalyst, and in most cases cis-1,4-polyisoprene cannot be obtained. It is indeed surprising that the use of aluminum bromide or iodide alone as the third component gives the favorable result. Thus it may be understood that the catalyst to be used in the isoprene polymerization in accordance with the present invention is quite unique.

The organotin hydride which is one component of the subject catalyst is triorganotin monohydride and diorganotin dihydride which are represented by the general formula $R_mSnH_{4-m}$ (the definitions of R and m are same to the foregoing), the former being the more preferred. The hydrocarbyl group R includes alkyl, aryl, and cycloalkyl. Among such organotin hydrides, those particularly preferred because of easy synthesis, high stability and easier handling are triethyltin hydride ($Et_3SnH$), tri-n-propyltin hydride (n-$Pr_3SnH$), triisopropyltin hydride (iso-$Pr_3SnH$), tri-n-butyltin hydride (n-$Bu_3SnH$) and triphenyltin hydride ($Pn_3SnH$).

The suitable ratio of the organotin hydride to titanium tetrachloride in the preparation of catalyst is 1.5 or above, when expressed by the ratio of mole number of Sn-H bond of organotin hydride to that of titanium (Sn-H/Ti, molar ratio). When the Sn-H/Ti molar ratio is less than 1.5, either polyisoprene of high cis-1,4-configuration content cannot be obtained, or a resin-like polymer is formed. Whereas, if the Sn-H/Ti molar ratio exceeds 6.0, no notable advantage to justify the use of such large amount of organotin hydride is obtained, and furthermore the catalytic activity tends to be reduced. For those reasons, the preferred range of Sn-H/Ti molar ratio is 1.5–6.0, particularly 2–5. Also the molar ratio of aluminium bromide or iodide to titanium tetrachloride as expressed by Al/Ti ranges 0.01 to 1.5, preferably 0.1–1.0. If the molar ratio of Al/Ti is excessively small, the effect of adding the aluminium halide is not fully exhibited. Whereas, if it is too great, the catalytic activity is reduced, or the formation of cis-1,4-polyisoprene is restricted. In the catalyst of the subject process, aluminium bromide is used with particular preference. Aluminium bromide allows greater variation range in the molar ratio of Al/Ti under a predetermined set of polymerization reaction conditions, than that with aluminium iodide. That is, with the use of aluminium bromide, the molar ratio of Al/Ti in the catalyst can be varied over considerably wide range with equally favorable isoprene polymerization result, and variation of the molar ratio within a certain limit during the polymerization reaction bears little detrimental effect on the result of said reaction.

The catalyst of the present invention is prepared by mixing the above-named three components in an inert atmosphere. In a preferred practice, the three components are mixed at room temperature, in an inert solvent with thorough stirring. If desired, the temperature may deviate from room temperature, within the range of, say, −20° C. to +50° C. In said mixing step, order of adding the components is optional. It is preferred, however, to first mix titanium tetrachloride which is dissolved in an inert solvent with the aluminium halide, and then add an organotin hydride to the mixture. As the inert solvent, hydrocarbons and halogenated hydrocarbons can be used, pentane, hexane, and heptane being the most preferred. The polymerization reaction is normally performed by contacting thus prepared catalyst with isoprene, while it is also possible to prepare the catalyst in the presence of isoprene. The catalyst of the present invention is extremely sensitive to oxygen and water, similarly to the conventionally known Ziegler catalyst, and is readily inactivated by such substances. Therefore, it is desirable that the solvent and isoprene employed in the catalyst preparation and polymerization reaction are thoroughly refined in advance. The suitable amount of the catalyst to be used in the polymerization reaction is such that 0.0001–0.05 mol, preferably 0.0005–0.005 mol of the titanium component is used per mol of the starting isoprene.

The operations of isoprene polymerization reaction in accordance with the present invention and of recovery of the formed polymer are similar to those in the known procedures using conventional catalysts. That is, the polymerization is performed by contacting isoprene with the catalyst in an inert solvent, preferably an inert hydrocarbon solvent, at temperatures ranging from 0–100° C. under stirring.

The polyisoprene obtained in accordance with the subject process is rubbery polymer containing at least 90% of cis-1,4-configuration, which has the properties resembling those of natural rubber.

Hereinafter the present invention will be explained in fuller details, referring to working examples. In said examples, n-hexane used as the inert solvent and the isoprene used as the starting material were washed with sulfuric acid and then with water, distilled on metal sodium, frozen with liquid nitrogen, and removed of air contained therein in vacuum, in advance of their use in the polymerization reaction. The polymerization products were analyzed by the infrared absorption spectrum method described in J. L. Binder et al., Anal. Chem. 29, 503 (1957).

EXAMPLE 1

Air in a 50-ml. capacity glass ampule was nitrogen-substituted, and the ampule was packed with 30 ml. of n-hexane, 0.997 millimol of titanium tetrachloride, and n-heptane solution of aluminium bromide ($AlBr_3$) (0.114 millimole as $AlBr_3$). Into the ampule then 3.02 millimole of trinormal-butyltin hydride (n-$Bu_3SnH$) was added at room temperature (21° C.), followed by stirring with magnetic stirrer. The molar ratio of Sn-H/Ti was 3.03, and that of Al/Ti was 0.114. Immediately after the content of said ampule became an uniform suspension, 6.79 g. of isoprene was added to the ampule which was subsequently sealed. The reaction was performed at 50° C. for 5 hours. Thereafter the reaction product was taken into 100 ml. of methanolbenzene mixed solvent (1:4) containing 0.125 g./l. of phenyl-β-naphthylamine, and allowed to stand overnight. To the product then 200 ml. of methanol was added to precipitate a rubbery polymer. The polymer was swollen with a minor amount of benzene and freeze-dried to yield 6.80 g. of polyisoprene. The yield was 100%. Further benzene was added to a part of the product polymer (the ratio of polymer to benzene was 2 g./100 ml.), refluxed in nitrogen atmosphere for an hour to dissolve the latter in the former, and the solution was centrifuged at 10,000 r.p.m. for 20 minutes to remove the benzene-insoluble matter contained in the polymer. The amount of the benzene-insoluble matter was 5.1 wt. percent to the total polymer. Hereinafter the content of such benzene-insoluble matter will be indicated as gel content. The solution of soluble polymer thus separated was further freeze-dried, and its intrinsic viscosity ([η]) in toluene at 30° C. was calculated to be 0.99 dl./g. From the analysis result of the soluble polymer with infrared absorption spectrum in carbon disulfide, it was confirmed that 95.4% of its total bond units was cis-1,4-configuration, 4.6% was 3,4-configuration, and no 1,2-configuration or trans-1,4-configuration was discovered.

EXAMPLE 2

Forty (40) ml. of n-hexane, 0.2 millimole of titanium tetrachloride, aluminium bromide of the amount varied in each run, 0.6 millimole of tri-n-butyltin hydride, and 10 ml. of isoprene were put into an ampule by the order stated, and subjected to 5 hours' polymerization at 45° C., by the same procedures as described in Example 1. The molar ratio of Al/Ti and polymerization result of each run were as indicated in Table 1 below.

TABLE 1

| Run number | Al/Ti, molar ratio | Conversion (percent) | Gel content (percent) | [η] (dl./g.) | Cis-1,4-configuration [2] (percent) |
|---|---|---|---|---|---|
| 1 [1] | 0 | 10.0 | | | |
| 2 | 0.101 | 25.4 | 1.0 | 3.43 | 96.0 |
| 3 | 0.202 | 47.2 | 9.0 | 3.31 | 96.1 |
| 4 | 0.303 | 55.0 | 14.6 | 3.53 | 96.3 |
| 5 | 0.402 | 67.2 | 13.0 | 2.50 | 96.1 |
| 6 | 0.502 | 72.8 | 11.8 | 2.44 | 96.1 |
| 7 | 0.613 | 84.7 | 0.8 | 2.71 | 95.8 |
| 8 | 0.723 | 89.8 | 5.4 | 2.64 | 96.8 |
| 9 | 0.779 | 88.6 | 6.3 | 2.65 | 96.6 |
| 10 | 0.895 | 91.0 | 3.2 | 2.58 | 96.7 |
| 11 | 1.01 | 65.5 | 2.6 | 2.90 | 96.3 |

[1] Run No. 1 is Control.
[2] The remainder was entirely 3,4-configuration in all runs.

EXAMPLE 3

Isoprene was polymerized by the action of the catalyst in which aluminium iodide ($AlI_3$) was used as the aluminium halide component, through the procedures as described in Example 2. The catalytic components employed were as follows: 0.501 millimole of titanium tetrachloride, 0.255 millimole of aluminium iodide, and 1.49 millimoles of tri-n-butyltin hydride. The conversion was 36%. In the resulting polymer, gel content was 0.9%, [η] was 1.12, and cis-1,4-configuration content was 96.3%.

EXAMPLE 4

Isoprene was polymerized with the identical procedures as described in Example, using as the catalytic components 0.2 millimole of titanium tetrachloride, 0.133 millimole of aluminium bromide, and tri-n-butyltin hydride of the amount varied in each run. In all runs the molar ratio of Al/Ti was 0.667, and that of Sn-H/Ti in each run was as indicated in the table below. The polymerization time was 3 hours. The results are also given in the same table.

TABLE 2

| Run Number | Sn-H/Ti, molar ratio | Conversion (percent) | Gel content (percent) | [η] (dl./g.) | Cis-1,4-configuration (percent) |
|---|---|---|---|---|---|
| 1 | 2.0 | 27.1 | 9.4 | 2.82 | 96.1 |
| 2 | 3.0 | 66.0 | 7.4 | 2.40 | 96.0 |
| 3 | 4.0 | 80.3 | 11.0 | 2.60 | 96.4 |
| 4 | 6.0 | 90.6 | 9.7 | 2.09 | 96.2 |

EXAMPLE 5

Isoprene was polymerized with the same procedures as described in Example 1, at 30° C. for 5 hours, using the following catalytic components: 3 millimoles of titanium tetrachloride, 0.3 millimole of aluminium bromide (as heptane solution), and 4.5 millimoles of di-n-butyltin dihydride (n-$Bu_2SnH_2$). The conversion was 78.0%, and the formed polymer had a gel content of 5.4% [η] of 0.81, and cis-1,4-configuration content of 94.8%. In a Control run using no aluminium bromide as the catalytic component, after 24 hours polymerization at 30° C., the conversion was 22.7%, gel content was 0.7%, [η] was 0.72, and cis-1,4-configuration content was 94.4%.

EXAMPLE 6

Isoprene was polymerized similarly to Example 1, at 30° C. for 2.5 hours, except that the following catalytic components were used: 1 millimole of titanium tetrachloride, 0.5 millimole of aluminium bromide, and 3 millimoles of triethyltin hydride ($Et_3SnH$). The conversion was 84.5%. In the resulting polymer, gel content was 6.8% [η] was 1.04, and cis-1,4-configuration content was 95.8%. In a Control run wherein no aluminium bromide was used, conversion was 12.1%, gel content was 2.8% [η] was 1.38, and cis-1,4-configuration content was 95.4% after 24 hours polymerization at 30° C.

CONTROL

Example 3 was repeated except that the aluminium iodide used as one of the catalytic components was replaced by aluminium chloride ($AlCl_3$), and that the polymerization was continued for 8 hours. The results were as in Table 3 below.

TABLE 3

| Run No. | Al/Ti, molar ratio | Conversion (percent) | Gel content (percent) | [η] (dl./g.) | Cis-1,4-configuration (percent) |
|---|---|---|---|---|---|
| 1 | 0.244 | 5.0 | 20.4 | 2.18 | 95.9 |
| 2 | 0.499 | ¹3.7 | | | |
| 3 | 0.745 | ¹0.8 | | | |
| 4 | 1.06 | ¹2.0 | | | |

¹ Resin-like polymer.

What is claimed is:

1. In a process for the preparation of polyisoprene containing at least 90% of cis-1,4-configuration comprising contacting isoprene in an inert solvent with a catalyst, the improvement wherein said catalyst is prepared by mixing in an inert solvent (a) titanium tetrachloride (b) an organotin hydride of the general formula $R_mSnH_{4-m}$, in which R is a hydrocarbyl group and $m$ is an integer of 2 or 3, and (c) an aluminum halide selected from the group consisting of aluminum bromide and aluminum iodide.

2. The process of claim 1, wherein said organotin hydride is trialkyltin hydride.

3. The process of claim 1, wherein said molar ratio of Sn-H bonds in said organotin hydride to the titanium tetrachloride, Sn-H/Ti, is within the range of 1.5–6.0:1.

4. The process of claim 1, wherein the molar ratio of aluminum halide to titanium tetrachloride, Al/Ti, is within the range of 0.01–1.5:1.

References Cited
UNITED STATES PATENTS

| | | | |
|---|---|---|---|
| 3,088,940 | 5/1963 | Jenkins | 260—88.7 |
| 3,163,629 | 12/1964 | Li | 260—93.7 |
| 3,222,348 | 12/1965 | Duck et al. | 260—94.3 |
| 3,432,515 | 3/1969 | Oruya et al. | 260—94.3 |
| 3,541,073 | 11/1970 | Nishida et al. | 260—94.5 |

JAMES T. SCIDLECK, Primary Examiner

R. A. GAITHER, Assistant Examiner